(12) United States Patent
Inoue et al.

(10) Patent No.: US 9,272,746 B2
(45) Date of Patent: Mar. 1, 2016

(54) VEHICLE BODY FRAME FOR A SADDLE-RIDE VEHICLE, AND MOTORCYCLE INCLUDING SAME

(71) Applicant: HONDA MOTOR CO., LTD., Minato-ku, Tokyo (JP)

(72) Inventors: Yusuke Inoue, Wako (JP); Tomoya Matsuo, Wako (JP); Kei Goto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/667,824

(22) Filed: Mar. 25, 2015

(65) Prior Publication Data
US 2015/0274238 A1  Oct. 1, 2015

(30) Foreign Application Priority Data

Mar. 28, 2014  (JP) ................................ 2014-069033

(51) Int. Cl.
| | |
|---|---|
| *B62K 11/02* | (2006.01) |
| *B62K 19/20* | (2006.01) |
| *B62K 19/06* | (2006.01) |

(52) U.S. Cl.
CPC ................. *B62K 19/20* (2013.01); *B62K 19/06* (2013.01)

(58) Field of Classification Search
CPC ............................... B62K 19/20; B62K 19/06
USPC ................ 280/281.1, 274; 180/311, 312, 219
See application file for complete search history.

(56) References Cited

U.S. PATENT DOCUMENTS

| | | | | |
|---|---|---|---|---|
| 4,699,233 A | * | 10/1987 | Koga ..................... | B62K 19/20 180/219 |
| 4,737,612 A | * | 4/1988 | Bruck .................. | B23K 26/242 219/121.64 |
| 4,913,337 A | * | 4/1990 | Gotoh ................... | B23K 26/14 219/121.64 |
| 5,921,339 A | * | 7/1999 | Matsuura ............... | B62K 11/04 180/219 |
| 7,360,619 B2 | | 4/2008 | Adachi et al. | |
| 7,845,450 B2 | * | 12/2010 | Kato ....................... | B62J 23/00 180/219 |
| 2004/0182634 A1 | * | 9/2004 | Adachi .................. | B62K 11/04 180/312 |
| 2007/0193805 A1 | * | 8/2007 | Adachi .................. | B62K 11/04 180/219 |
| 2008/0258422 A1 | * | 10/2008 | Suzuki .................. | B62K 11/04 280/274 |

FOREIGN PATENT DOCUMENTS

JP          2004-256073 A        9/2004

* cited by examiner

*Primary Examiner* — Tony Winner
(74) *Attorney, Agent, or Firm* — Carrier Blackman & Associates, P.C.; William D. Blackman; Joseph P. Carrier

(57) ABSTRACT

A vehicle body frame manufactured by welding is configured for weight reduction, and includes first and second frame members. The first frame member has a predetermined thickness including a first flat surface portion wider than the predetermined thickness. The second frame member includes a second flat surface portion touching the first flat surface portion. The first and second frame members are joined by bringing the flat surface portions together and welding the first and second flat surface portions together with laser beams parallel to the first flat surface portion. In this way, the laser welding can be performed with a reduced gap between the two members. Welding using laser beams applied from directions parallel to the flat surfaces allows the weld area to be significantly larger than conventional fillet welding.

16 Claims, 8 Drawing Sheets

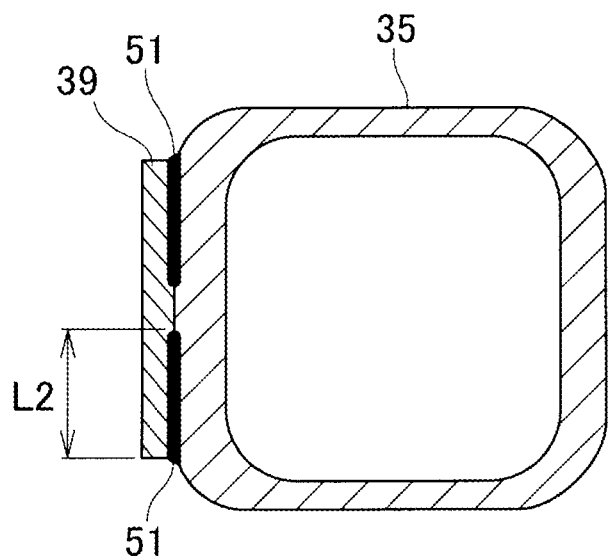
FIG. 3A EXAMPLE
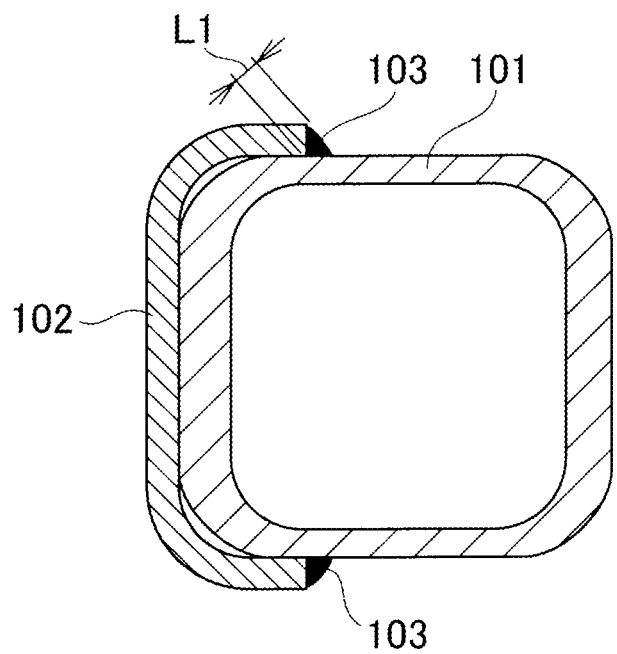
FIG. 3B COMPARATIVE EXAMPLE

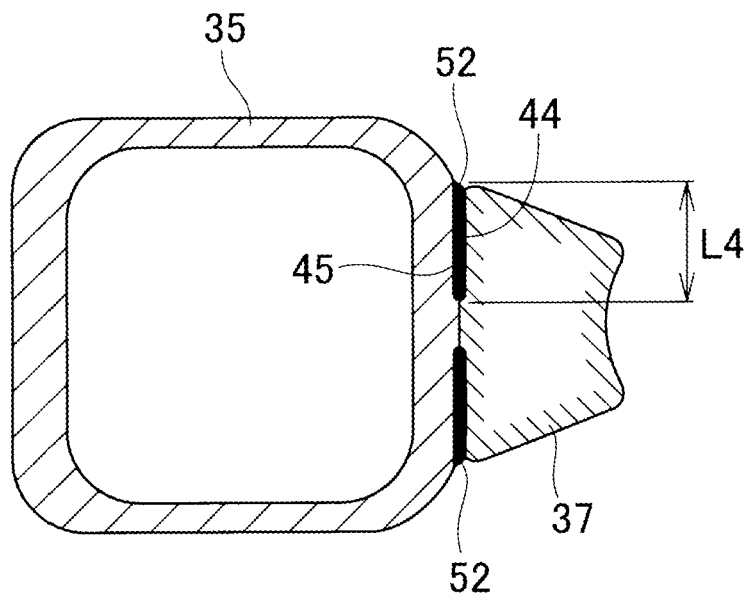
FIG. 5A EXAMPLE
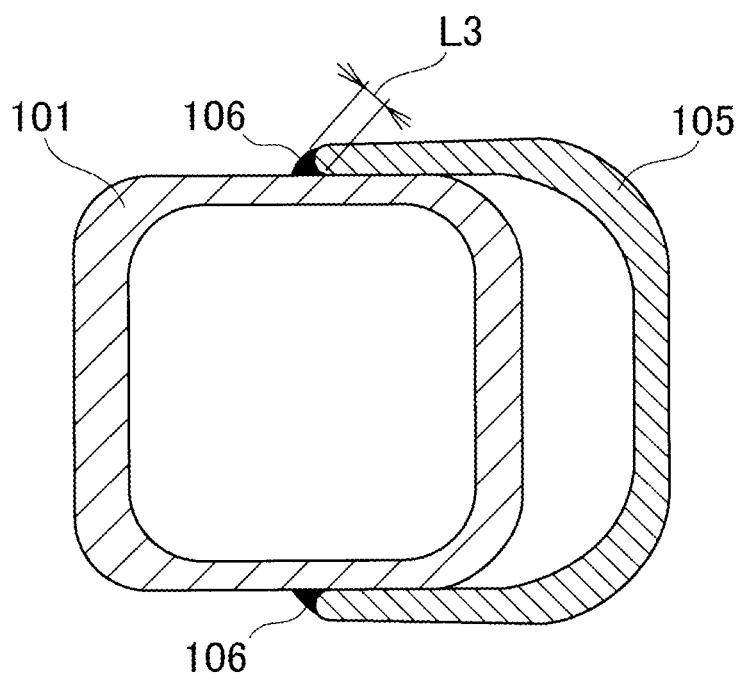
FIG. 5B COMPARATIVE EXAMPLE

EXAMPLE

COMPARATIVE EXAMPLE

VEHICLE BODY FRAME FOR A SADDLE-RIDE VEHICLE, AND MOTORCYCLE INCLUDING SAME

CROSS-REFERENCE TO RELATED APPLICATIONS

The present invention claims priority under 35 USC 119 based on Japanese Patent Application No. 2014-069033, filed on 28 Mar. 2014. The entire subject matter of this priority document, including specification claims and drawings thereof, is incorporated by reference herein.

BACKGROUND OF THE INVENTION

1. Field of the Invention

The present invention relates to a vehicle body frame for a saddle-ride vehicle, and to a motorcycle including the vehicle body frame.

2. Description of the Background Art

In many cases, vehicle body frames of saddle-ride vehicles are manufactured by welding together sections of pipe materials and tubular frames.

Two frame members may be joined either by butt welding or by fillet welding (see Patent Document 1 (FIG. 10), for example).

FIG. 10(a) of Patent Document 1 shows a cross section of a vehicle body frame. A stiffener gusset (60) (numbers in parenthesis represent ref. no.s described in the cited document; the same applies below) is joined to a down pipe (40) by welding. Specifically, end portions (65a, 66a) of the stiffener gusset (60) are joined to the down pipe (40) with weld beads illustrated in black.

Each of the weld beads has a substantially triangular cross section, and is therefore a bead formed by "fillet welding." In fillet welding, the distance from the vertex of the right angle side of a right triangle to its hypotenuse is called "throat thickness." The product of this "throat thickness" and the length of the weld (or the circumferential length in the case of circumferential welding) is the "weld area." This weld area determines the "joint strength (or weld strength)."

The throat thickness is determined in proportion to the thickness of the end portion (65a, 66a). The circumferential length is determined by the size of the stiffener gusset (60).

When the required joint strength is large, such a requirement is fulfilled by increasing the thickness (and/or the size) of the stiffener gusset (60). In this way, however, the weight of the stiffener gusset (60) increases. As a result, the vehicle body frame becomes heavy, and therefore the vehicle becomes heavy.

There has been a strong demand for reducing vehicles' weights, driven in part by an effort to reduce fuel consumption. Therefore, welded vehicle body frames are also targeted for weight reduction.

[Patent Document 1] Japanese Patent Application Publication No. 2004-256073

SUMMARY OF THE INVENTION

Reference numbers are included in the following description corresponding to the reference numbers used in the drawings. Such reference numbers are provided for purposes of illustration, and are not intended to limit the invention.

For the purpose of solving the above-mentioned problem, a first aspect of the present invention provides a vehicle body frame for a saddle-ride vehicle for rotatably supporting a front wheel and a rear wheel, supporting a motive power source disposed between the front wheel and the rear wheel, and supporting a seat disposed above the motive power source, including:

a first frame member; and a second frame member, in which the first frame member has a predetermined thickness and includes a first flat surface portion at least in part thereof, the first flat surface portion being wider than the thickness, the second frame member includes a second flat surface portion at least in part thereof, the second flat surface portion being in contact with the first flat surface portion, and the second frame member is joined to the first frame member by bringing the second flat surface portion into contact with the first flat surface portion and welding the first flat surface portion and the second flat surface portion with a laser beam which is parallel to the first flat surface portion.

In a second aspect of the present invention, the vehicle body frame includes:

a head pipe configured to steerably support the front wheel; and a down frame as the first frame member connected to the head pipe and extending downward, the down frame as the first frame member is an angular pipe extending rearwardly downward from the head pipe to support the motive power source and includes the first flat surface portion at a front surface, and the second frame member is a head-pipe extending portion formed integrally with the head pipe and extending rearwardly downward and includes the second flat surface portion at a rear surface.

In a third aspect of the present invention, a vehicle-width-direction width of the head-pipe extending portion is equal to or less than a vehicle-width-direction width of the down frame.

In a fourth aspect of the present invention, the head pipe is a forged part which the head-pipe extending portion is formed integrally with.

In a fifth aspect of the present invention, the vehicle body frame includes:

a head pipe steerably supporting the front wheel;

a main frame connected to the head pipe and extending toward a rear of the vehicle; and a down frame as the first frame member connected to the head pipe and extending downward, the down frame as the first frame member is an angular pipe extending rearwardly downward from the head pipe to support the motive power source and includes the first flat surface portion at a rear surface, and the second frame member is a reinforcing member connected at a front end to the down frame and connected at a rear end to the main frame to reinforce the vehicle body frame, and includes the second flat surface portion at a front surface.

In a sixth aspect of the present invention, a vehicle-width-direction width of the front surface of the reinforcing member is equal to or less than a vehicle-width-direction width of the down frame.

In a seventh aspect of the present invention, the down frame as the first frame member further includes a third flat surface portion equivalent to the first flat surface portion at a front surface, the head pipe includes a head-pipe extending portion formed integrally therewith and extending rearwardly downward, and includes a fourth flat surface portion equivalent to the second flat surface portion at a rear surface of the head-pipe extending portion, and a vehicle-width-direction width of the head-pipe extending portion is equal to or less than the vehicle-width-direction width of the down frame.

In an eighth aspect of the present invention, the first frame member is an angular pipe and includes the first flat surface portion at one of a plurality of surfaces thereof, and the second frame member is a motive-power-source fastening bracket for fastening the motive power source to the angular pipe and includes the second flat surface portion.

In a ninth aspect of the present invention, the motive-power-source fastening bracket is a plate-shaped member having a plurality of flat surfaces, and one of the flat surfaces is the second flat surface portion.

Effects of the Invention

According to the first aspect of the present invention, the first frame member and the second frame member are brought into contact with each other at their flat surfaces. In this way, the laser welding can be performed with the gap between the two members reduced. Moreover, by the welding using a laser beam applied from a direction parallel to the flat surfaces, the two members can be welded in the depth direction of the laser beam, i.e. at the flat surfaces. Thus, the weld area can be significantly large for the thickness of a conventional pipe material (as compared to conventional fillet welding). Moreover, operation of a laser welding torch becomes easy, thereby making it possible to shorten the welding time.

According to the second aspect of the present invention, reactive force produced by the front wheel contacting a road surface is inputted to the head pipe. On the other hand, the down frame supports the motive power source (such as an engine, a motor, or a battery) which is a heavy part, and is therefore a member which does not follow the reactive force from the road surface. Since the head pipe and the down frame behave in different ways, large force is applied to the connecting portions of the head pipe and the down frame, thereby generating large stress. In the present invention, the flat surfaces at these connecting portions are brought into contact with each other to receive the force at the contacting surfaces and ensure the weld area by using the flat surfaces. In this way, the weld area can be ensured efficiently. Accordingly, it is possible to reduce the size of the head-pipe extending portion and therefore reduce the weight of the vehicle body frame.

According to the third aspect of the present invention, the vehicle-width-direction width of the head-pipe extending portion is equal to or less than the vehicle-width-direction width of the down frame. It is possible to reduce the size of the head-pipe extending portion and also receive the head-pipe extending portion only at the front surface of the down frame. The left and right surfaces of the down frame are not welded. Since the left and right surfaces of the down frame are not welded, the material's natural strength can be utilized at the left and right surfaces, and the shape of the down frame can therefore be simple.

According to the fourth aspect of the present invention, the head pipe is a forged part which the head-pipe extending portion is formed integrally with. Since the third aspect can reduce the size of the head-pipe extending portion, its forging can be easily done with a smaller amount of the material. Thus, the cost of the material and the cost of the plastic working can be lowered.

According to the fifth aspect of the present invention, the structure is such that even when reactive force produced by the front wheel contacting a road surface is inputted to the down frame through the head pipe, the reinforcing member laid between the down frame and the main frame prevents the down frame from tilting.

Here, the flat surfaces of the down frame and the reinforcing member are brought into contact with each other. Thus, it is possible to receive the force at the contacting surfaces and ensure the weld area by using the flat surfaces. Accordingly, it is possible to reduce the size of the reinforcing member and therefore reduce the weight of the vehicle body frame.

According to the sixth aspect of the present invention, the vehicle-width-direction width of the front surface of the reinforcing member is equal to or less than the vehicle-width-direction width of the down frame. Thus, the size of the reinforcing member is reduced and the reinforcing member is received only at the front surface of the down frame, and the left and right surfaces of the down frame are not welded. Since the left and right surfaces of the down frame are not welded, the material's natural strength can be utilized at the left and right surfaces, and the shape of the down frame can therefore be simple.

According to the seventh aspect of the present invention, the down frame further includes the third flat surface portion equivalent to the first flat surface portion at the front surface; the head pipe includes the head-pipe extending portion formed integrally therewith and extending rearwardly downward, and includes the fourth flat surface portion equivalent to the second flat surface portion at the rear surface of the head-pipe extending portion; and the vehicle-width-direction width of the head-pipe extending portion is equal to or less than the vehicle-width-direction width of the down frame. The front and rear surfaces of the down frame are used, but the left and right surfaces of the down frame are not welded. Since the left and right surfaces of the down frame are not welded, the material's natural strength can be utilized at the left and right surfaces, and the shape of the down frame can therefore be simple.

According to the eighth aspect of the present invention, the first frame member is an angular pipe and includes the first flat surface portion at one of the plurality of surfaces thereof, and the second frame member is the motive-power-source fastening bracket for fastening the motive power source to the angular pipe and includes the second flat surface portion. The joining of the angular pipe and the motive-power source fastening bracket requires high joint strength for securely supporting the motive power source which is a heavy part. The flat surfaces at these joining portions are brought into contact with each other to receive force at the contacting surfaces and ensure the weld area by using the flat surfaces. Since the weld area can be ensured efficiently, the weight of the vehicle body frame can be reduced.

According to the ninth aspect of the present invention, the motive-power-source fastening bracket is a plate-shaped member having a plurality of flat surfaces, and one of the flat surfaces is the second flat surface portion. A flat surface provided to the plate-shaped member is utilized ably to join the motive-power-source fastening bracket to the angular pipe. Since the weld area can be ensured, the size of the plate-shaped member can be reduced.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 3A is a cross-sectional view taken along a line 3a-3a in FIG. 2, and is a view describing a first embodiment.

FIG. 3B is a cross sectional view of comparative example in which a head-pipe extending portion is joined to a down frame with fillet weld beads.

FIGS. 4A-4C are views describing a laser welding method, in which FIG. 4A shows a state before joining; FIG. 4B shows a down frame fixed to a mount and a head-pipe extending portion brought into contact with the down frame; and FIG. 4C shows formation of first laser weld beads between the down frame and head-pipe extending portion.

FIG. 5A is a cross-sectional view taken along a line 5a-5a in FIG. 2, and is a view for describing a second embodiment.

FIG. 5B is a cross sectional view of a comparative example, in which a reinforcing-member gusset is joined to the down frame with fillet weld beads.

DETAILED DESCRIPTION OF ILLUSTRATIVE EMBODIMENTS

An illustrative embodiment of the present invention will be described hereinafter in detail with reference to the accompanying drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Figure 1:
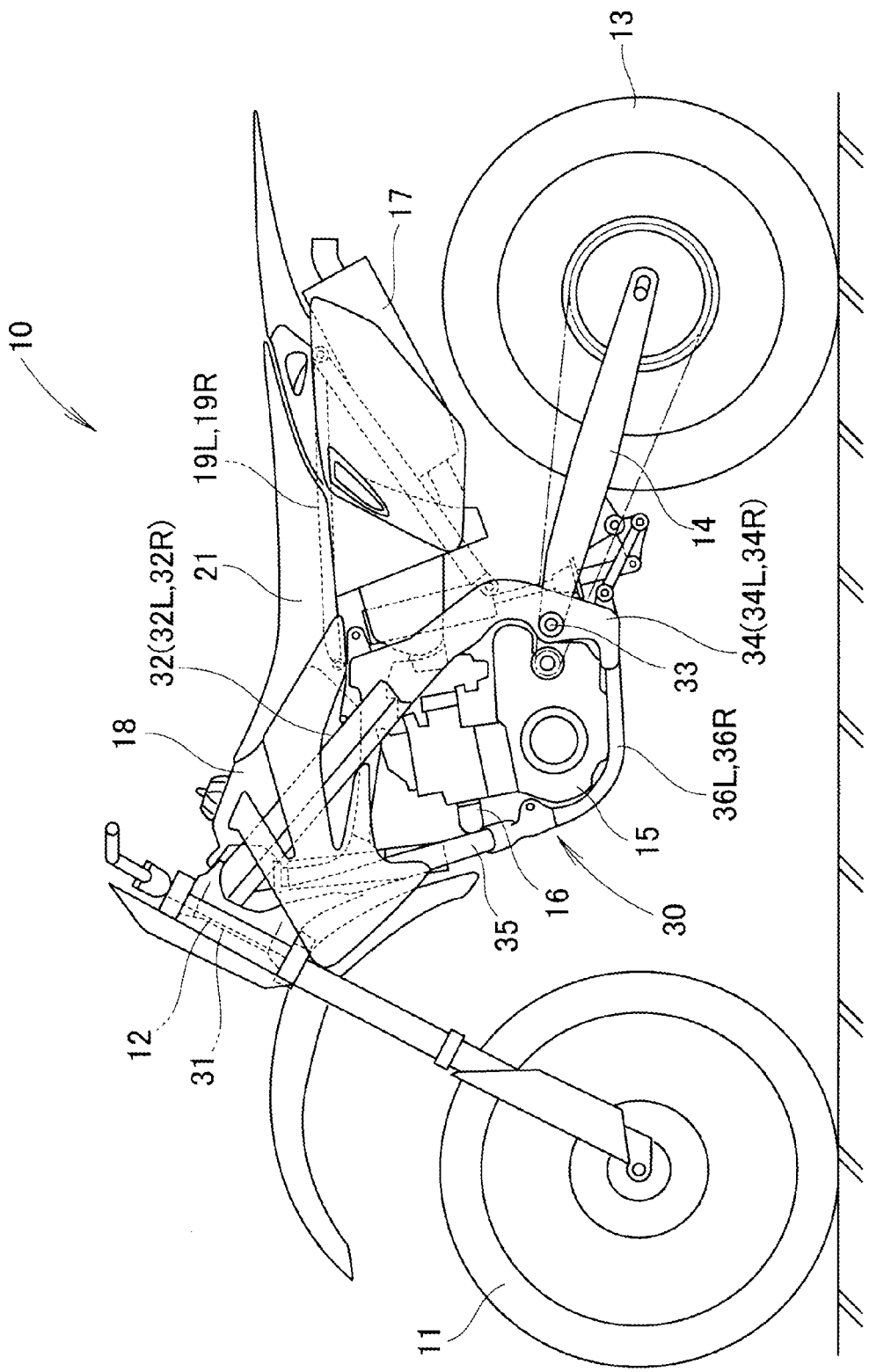
FIG. 1 is a left-side view of a motorcycle according to the present invention.

As shown in FIG. 1, a vehicle body frame 30 of a motorcycle 10 as a saddle-ride vehicle includes: a head pipe 31 on which a steering shaft 12 for steering a front wheel 11 is rotatably supported; a main frame 32 (preferably left and right main frames 32L, 32R) welded at the front end to the head pipe 31 and extending toward the rear of the vehicle; a pivot frame 34 supporting a swingarm 14 which is coupled to a rear portion of the main frame 32 through a pivot shaft 33 and on which a rear wheel 13 is supported vertically movably; seat frames 19L, 19R supporting a seat 21 for an occupant to sit extending from rear portions of the left and right main frames 32L, 32R or upper portions of the pivot frames 34L, 34R; a down frame 35 extending rearwardly downward from the head pipe 31; and left and right lower frames 36L, 36R extending from a lower portion of the down frame 35 toward the rear of the vehicle body and connected respectively to the left and right pivot frames 34L, 34R to cover a motive power source 15 from below.

In this embodiment, the main frame 32 is formed by a left main frame 32L (L is a suffix letter representing left; the same applies below) and a right main frame 32R (R is a suffix letter representing right; the same applies below). The left and right pivot frames 34L, 34R are connected to the rear portions of the left and right main frames 32L, 32R, respectively. Note that the main frame 32 is a so-called center frame with a structure which may be a single longitudinal frame extending along the center in the vehicle width direction.

The motive power source 15 may be any of an internal combustion engine (a gasoline engine or a diesel engine), an electric motor, a battery, and a fuel cell. In this example, the motive power source 15 is a gasoline engine. The motive power source 15 is housed and supported in a space defined by the vehicle body frame 30, and an exhaust pipe 16 extends from the motive power source 15. The exhaust pipe 16 extends toward the rear of the vehicle by passing by a lateral side (the right side in this example) of the motive power source 15. A silencer 17 is attached to a rear portion of the exhaust pipe 16.

Moreover, a fuel tank 18 is attached behind the head pipe 31 and between the left and right main frames 32.

Figure 2:
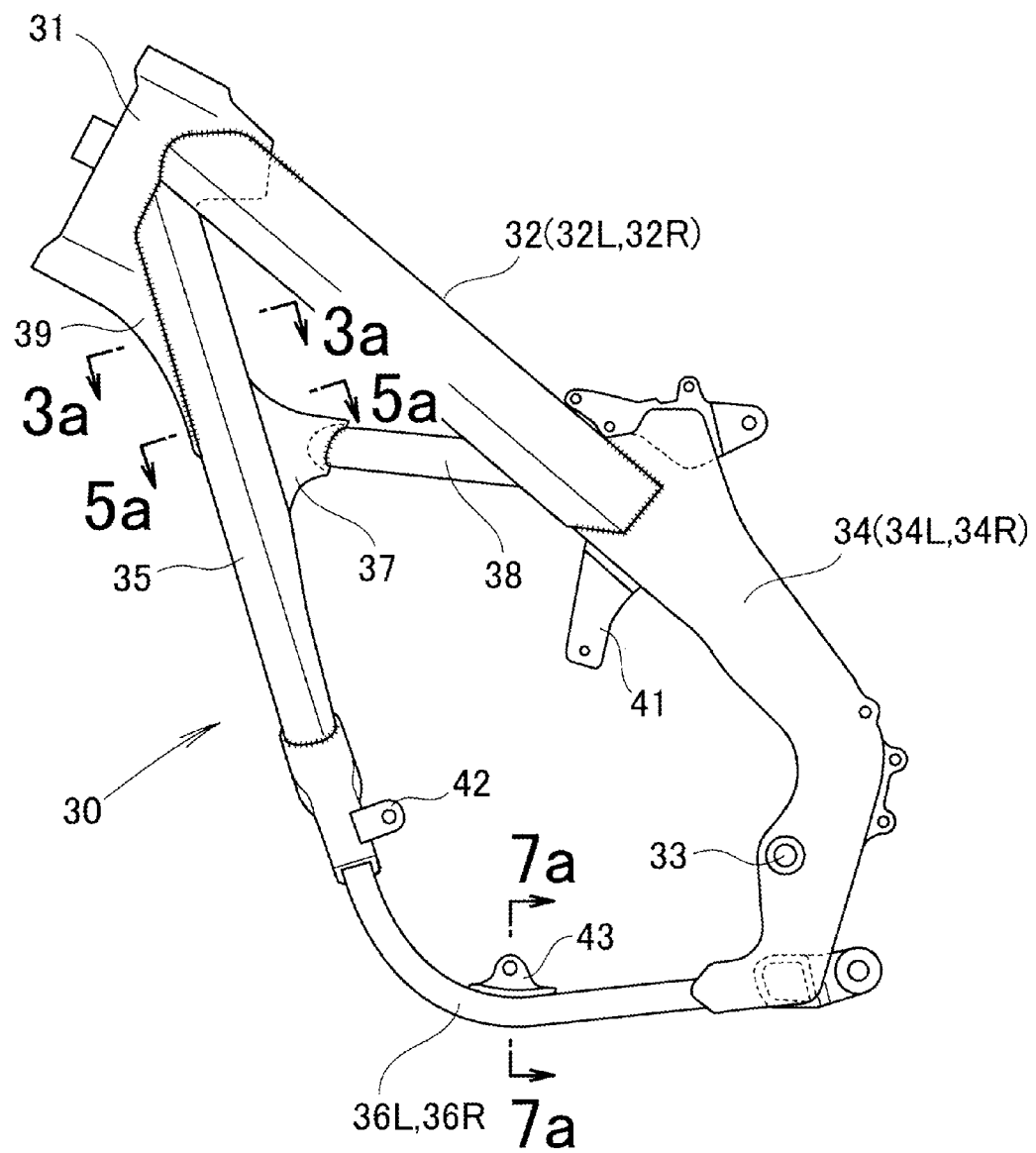
FIG. 2 is a view showing the vehicle body frame of a saddle-ride vehicle according to the present invention.

As shown in FIG. 2, the vehicle body frame 30 includes: the head pipe 31; the left and right main frames 32L, 32R extending toward the rear of the vehicle from the head pipe 31; the left and right pivot frames 34L, 34R extending downward from the rear portions of the left and right main frames 32L, 32R; the down frame 35 extending obliquely downward from the head pipe 31; the lower frames 36L, 36R extending from the rear portion of the down frame 35 and connected to the pivot frames 34L, 34R; and a reinforcing member 38 connected to the down frame 35 through a reinforcing-member gusset 37, extending toward the rear of the vehicle body along the center of the vehicle body, and connected to the left and right main frames 32L, 32R to reinforce the down frame 35.

Note that a head-pipe extending portion 39 of a tongue piece shape is formed integrally with a lower portion of the head pipe 31. The head-pipe extending portion 39 extends obliquely downward, and the down frame 35 is joined to the head pipe 31 through the head-pipe extending portion 39.

If the head pipe 31 is manufactured by casting or forging, the head-pipe extending portion 39 can easily be integrally formed.

Moreover, the motive power source (FIG. 1, ref. no. 15) is fastened to the vehicle body frame 30 through a first motive-power-source fastening bracket 41 extending downward from the lower surface of an upper portion of the pivot frame 34, a second motive-power-source fastening bracket 42 extending toward the rear of the vehicle from a lower portion of the down frame 35, and third motive-power-source fastening brackets 43 extending upward from center portions of the lower frames 36L, 36R.

The present invention relates to connecting portions (joining portions) existing on the vehicle body frame 30, and a member serving as a main part will be referred to as a first frame member whereas a joined member to be joined to the first frame member by welding will be referred to as a second frame member.

Herein below, embodiments of the first and second frame members and embodiments of how they are welded will be described.

First Embodiment of First and Second Frame Members

As shown in FIG. 3A, the down frame 35 is the first frame member, and the head-pipe extending portion 39 is the second frame member.

Figure 4A:
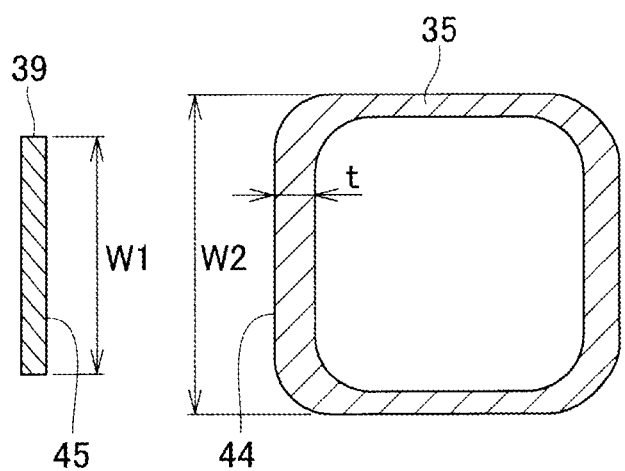

FIG. 4A shows a state before joining. The down frame 35 as the first frame member is an angular pipe, which has a predetermined thickness t at the front wall and includes a first flat surface portion 44 at least at part of the front surface, the first flat surface portion 44 being wider than the thickness t. The first flat surface portion 44 may be part of or the whole front surface.

The head-pipe extending portion 39 as the second frame member includes a second flat surface portion 45 at the back surface.

A vehicle-width-direction width W1 of the head-pipe extending portion 39 is preferably set equal to or less than a vehicle-width-direction width W2 of the down frame 35.

Figure 4B:
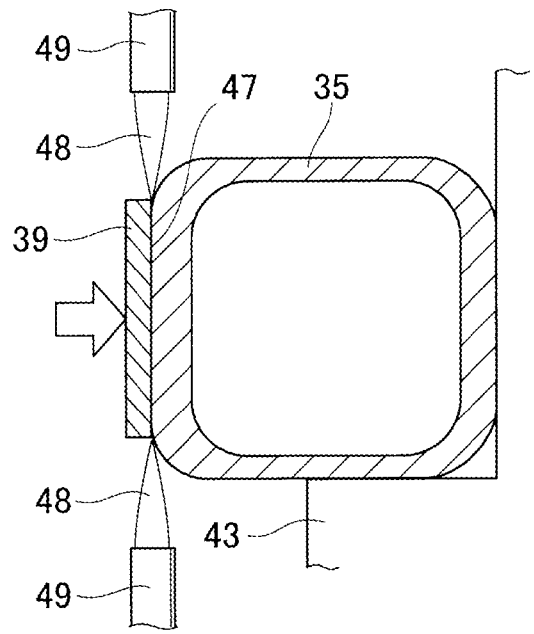

Then, as shown in FIG. 4B, the down frame 35 is fixed to a mount 43. The head-pipe extending portion 39 is brought into contact with the down frame 35 such that the second flat surface portion 45 can overlap the first flat surface portion 44. The head-pipe extending portion 39 is pushed hard with a hydraulic jack or the like as illustrated by a white arrow to reduce a gap 47 as much as possible (to 0.01 mm or less, for example). The first flat surface portion 44 and/or the second flat surface portion 45 may be flatted and smoothened by mechanical working to reduce the gap 47.

Then, laser welding torches 49, 49 are each placed in such a way as to be able to apply a laser beam 48 in parallel (or substantially in parallel) to the first flat surface portion 44. Then, the portions around the gap 47 are melted with the laser beams 48, 48.

Figure 4C:
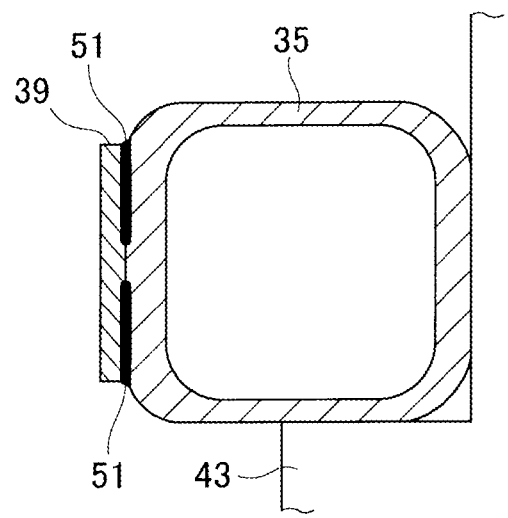

As a result, first laser weld beads 51, 51 are formed which have a large aspect ratio (depth/width) as shown in FIG. 4C.

In a comparative example shown in FIG. 3B, a head-pipe extending portion 102 in contact with a down frame 101 has a square U-shaped cross section and is joined to the down frame 101 with fillet weld beads 103, 103. The joint strength is proportional to the product of a throat thickness L1 and the circumferential length (weld length). As the head-pipe extending portion 102 is made thicker, the throat thickness increases in proportion thereto. Thus, in the comparative example, the joint strength is ensured by making the head-pipe extending portion 102 larger to increase the circumferential length and also by increasing the thickness of the head-pipe extending portion 102. Consequently, in the comparative example, the head-pipe extending portion 102 becomes large, thereby increasing the weight and also increasing the amount of the material.

On the other hand, in the example shown in FIG. 3A, a bead width L2 of the first laser weld beads 51, 51 is significantly large, thereby making it possible to ensure the necessary joint strength even if the circumferential length (weld length) is small. Since the throat thickness L1 does not need to be large, the thickness of the head-pipe extending portion 39 can be small, and the weight can therefore be reduced easily. That the bead width L2 can be ensured also means that the vehicle-width-direction width of the head-pipe extending portion 39 (FIG. 4A, ref. no. W1) can be smaller than the width of the down frame 35 (FIG. 4A, ref. no. W2).

Second Embodiment of First and Second Frame Members

As shown in FIG. 5A, the down frame 35 is the first frame member, and the reinforcing-member gusset 37 is the second frame member. Note that the reinforcing-member gusset 37 may be formed integrally with a front portion of the reinforcing member (FIG. 2, ref. no. 38) to omit the reinforcing-member gusset 37 as a single separate member. In this example, however, the front portion of the reinforcing member is regarded as the reinforcing-member gusset 37 for convenience.

In a comparative example shown in FIG. 5B, a reinforcing-member gusset 105 has a square U-shaped cross section and is joined to the down frame 101 with fillet weld beads 106, 106. The joint strength is proportional to the product of a throat thickness L3 and the circumferential length (weld length). As the reinforcing-member gusset 105 is made thicker, the throat thickness increases in proportion thereto. Thus, in the comparative example, the joint strength is ensured by making the reinforcing-member gusset 105 larger to increase the circumferential length and also by increasing the thickness of the reinforcing-member gusset 105. Consequently, in the comparative example, the reinforcing-member gusset 105 becomes large, thereby increasing the weight and also increasing the amount of the material.

On the other hand, in the example shown in FIG. 5A, a second flat surface portion 45 of the reinforcing-member gusset 37 is brought into contact with a first flat surface portion 44 and they are joined by laser welding.

A bead width L4 of second laser weld beads 52, 52 is significantly large, thereby making it possible to ensure the necessary joint strength even if the circumferential length (weld length) is small. Since the throat thickness L3 does not need to be large, the thickness of the reinforcing-member gusset 37 can be small, and the weight can therefore be reduced easily.

That the bead width L4 can be ensured also means that the vehicle-width-direction width of the reinforcing-member gusset 37 can be smaller than the vehicle-width-direction width of the down frame.

Third Embodiment of First and Second Frame Members

Figure 6A:
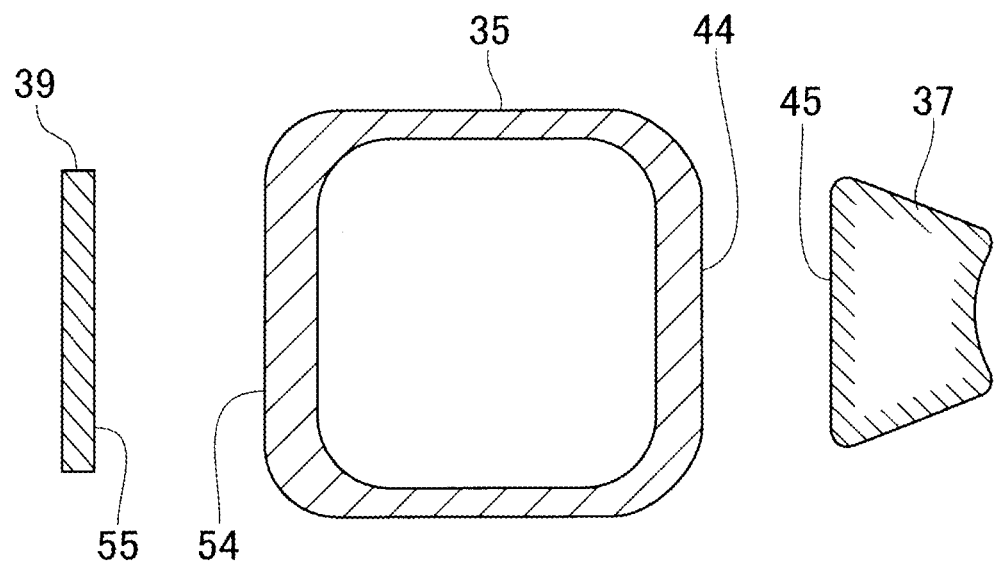
FIG. 6A and FIG. 6B are views for describing a third embodiment.

As shown in FIG. 6A, the down frame 35 is the first frame member, and the reinforcing-member gusset 37 and the head-pipe extending portion 39 are the second frame member.

The down frame 35 includes the aforementioned first flat surface portion 44 at the rear surface and a third flat surface portion 54 equivalent to the first flat surface portion 44 at the front surface. Specifically, the third flat surface portion 54 is the same as the first flat surface portion 44 described with reference to FIG. 4A, but the name and ref. no. of the element have been changed to avoid confusion.

Likewise, the head-pipe extending portion 39 includes a fourth flat surface portion 55 equivalent to the aforementioned second flat surface portion 45 at the rear surface. Specifically, the fourth flat surface portion 55 is the same as the second flat surface portion 45 described with reference to FIG. 4A, but the name and ref. no. of the element have been changed to avoid confusion.

The vehicle-width-direction widths of the reinforcing-member gusset 37 and the head-pipe extending portion 39 are desirably made smaller than the vehicle-width-direction width of the down frame 35.

The reinforcing-member gusset 37 is joined to the down frame 35 with the second flat surface portion 45 in contact with the first flat surface portion 44. In addition, the head-pipe extending portion 39 is joined to the down frame 35 with the fourth flat surface portion 55 in contact with the third flat surface portion 54.

Figure 6B:
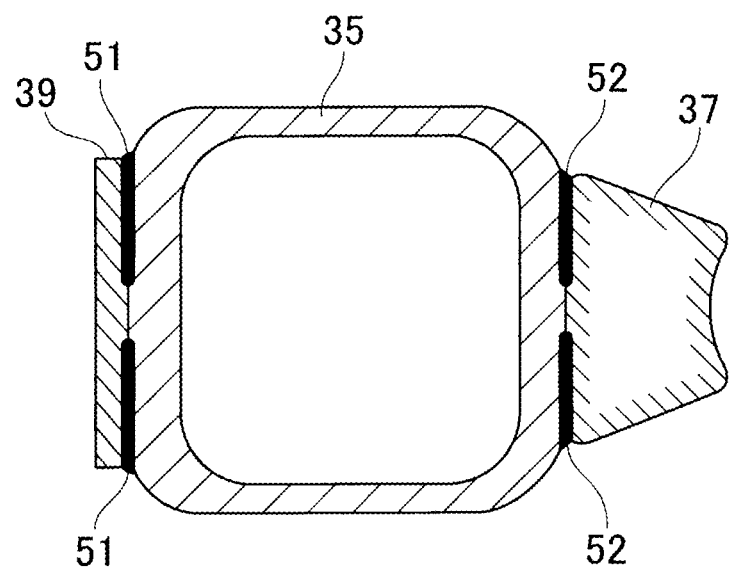

As a result, as shown in FIG. 6B, the head-pipe extending portion 39 is firmly joined to the down frame 35 with first laser weld beads 51, 51, and the reinforcing-member gusset 37 is firmly joined to the down frame 35 with second laser weld beads 52, 52. In this way, the weight of the vehicle body frame 30 can be reduced greatly.

Fourth Embodiment of First and Second Frame Members

Figure 7A:
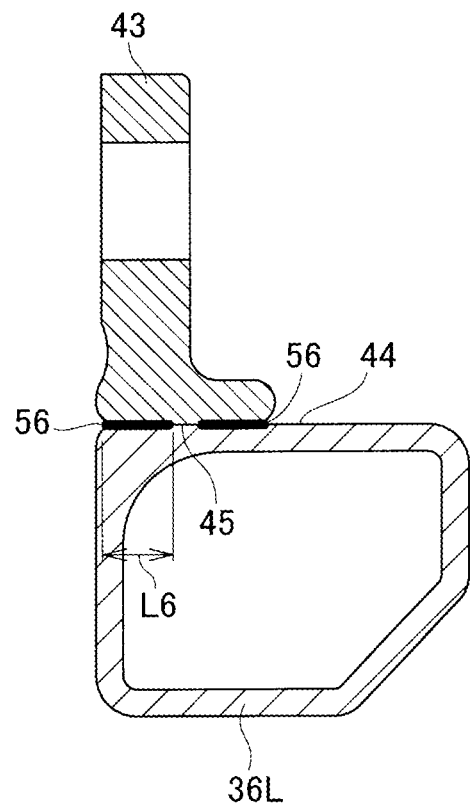
FIG. 7A is a cross-sectional view taken along a line 7a-7a in FIG. 2, and is a view for describing a fourth embodiment.

As shown in FIG. 7A, the first frame member is the left lower frame 36L, and the left lower frame 36L is an angular pipe having multiple surfaces. In this example, the left lower frame 36L includes a first flat surface portion 44 at the upper surface.

The second frame member is the third motive-power-source fastening bracket 43 and includes a second flat surface portion 45 at the lower surface.

Since the right lower frame (FIG. 1, ref. no. 36R) is symmetric (line symmetric) to the left lower frame 36L with respect to the center in the vehicle width direction, description thereof is omitted.

Figure 7B:
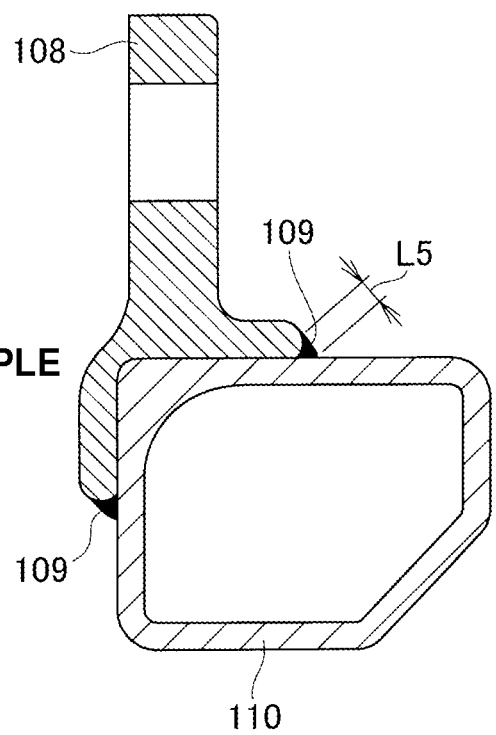
FIG. 7B is a cross sectional view of a comparative example, in which a third motive-power-source fastening bracket is joined to a left lower frame with fillet weld beads.

In a comparative example shown in FIG. 7B, a lower portion of a third motive-power-source fastening bracket 108 has an L-shaped cross section and is joined to a left lower frame 110 with fillet weld beads 109, 109. The joint strength is proportional to the product of a throat thickness L5 and the circumferential length (weld length). As the lower portion of the third motive-power-source fastening bracket 108 is made thicker, the throat thickness increases in proportion thereto. Thus, in the comparative example, the joint strength is ensured by making the lower portion of the third motive-power-source fastening bracket 108 larger to increase the circumferential length and also by increasing the thickness of the lower portion of the third motive-power-source fastening bracket 108. Consequently, in the comparative example, the third motive-power-source fastening bracket 108 becomes large, thereby increasing the weight and also increasing the amount of the material.

On the other hand, in the example shown in FIG. 7A, a bead width L6 of third laser weld beads 56, 56 is significantly large, thereby making it possible to ensure the necessary joint strength even if the circumferential length (weld length) is small. Since the throat thickness L5 does not need to be large, the thickness of the third motive-power-source fastening bracket 43 can be small, and the weight can therefore be reduced easily. Since the bead width L6 can be ensured, the size and weight of the third motive-power-source fastening bracket can be reduced.

Modification of Fourth Embodiment

Figure 8:
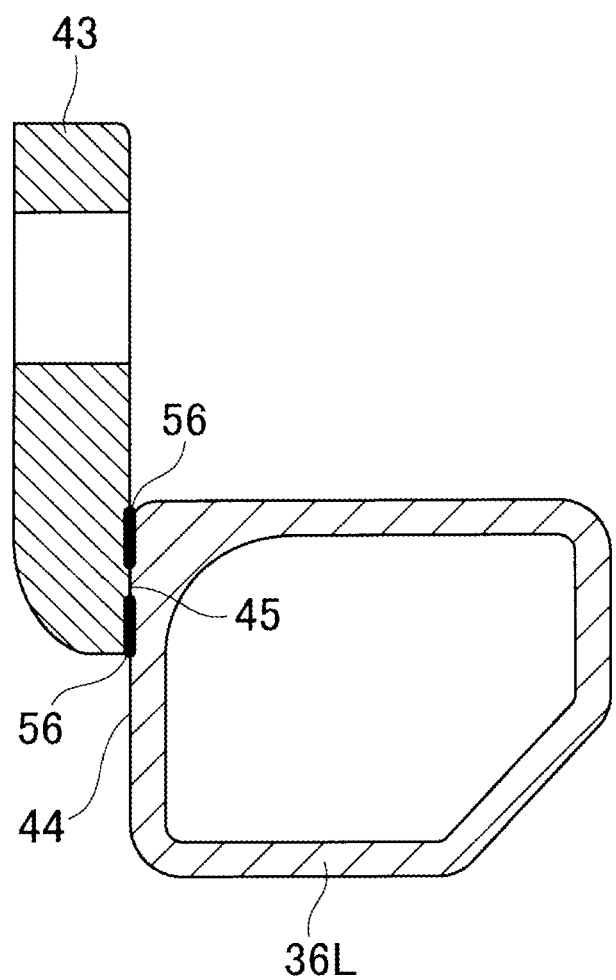
FIG. 8 is a view for describing a modification of the fourth embodiment.

As shown in FIG. 8, the first frame member is the left lower frame 36L, and the left lower frame 36L is an angular pipe having multiple surfaces. In this example, the left lower frame 36L includes a first flat surface portion 44 at the side surface on the center side of the vehicle body.

The second frame member is the third motive-power-source fastening bracket 43 and includes a second flat surface portion 45 at a lower portion of a side surface. Moreover, the third motive-power-source fastening bracket 43 is firmly joined to the left lower frame 36L with third laser weld beads 56, 56.

The first and second motive-power-source fastening brackets 41, 42 described with reference to FIG. 2 may be firmly joined to an upper portion of the pivot frame 34 and a lower portion of the down frame 35, each of which is the first frame member, in a similar manner with third laser weld beads 56, 56. In this way, the size and weight can be reduced as well.

Note that the saddle-ride vehicle is preferably a motorcycle but may be a three-wheeled buggy or a four-wheeled buggy including a saddle-shaped seat.

The present invention is preferable as a vehicle body frame of a saddle-ride vehicle.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

DESCRIPTION OF REFERENCE NUMBERS

10 Saddle-Ride Vehicle (Motorcycle)
11 Front Wheel
13 Rear Wheel
15 Motive Power Source
30 Vehicle Body Frame
31 Head Pipe
32 Main Frame
35 First Frame Member (Down Frame)
36l First Frame Member (Left Lower Frame)
37 Second Frame Member (Reinforcing-Member Gusset)
38 Second Frame Member (Reinforcing Member)
39 Second Frame Member (Head-Pipe Extending Portion)
43 Second Frame Member (Motive-Power-Source Fastening Bracket); (Third Motive-Power-Source Fastening Bracket)
44 First Flat Surface Portion
45 Second Flat Surface Portion
48 Laser Beam
49 Laser Welding Torch
54 Third Flat Surface Portion
55 Fourth Flat Surface Portion

What is claimed is:

1. A vehicle body frame for a saddle-ride vehicle, said vehicle body frame configured for rotatably supporting a front wheel and a rear wheel, supporting a motive power source disposed between the front wheel and the rear wheel, and supporting a seat thereon above the motive power source, said vehicle body frame comprising:
   a first frame member having a first portion with a predetermined thickness and also having a first flat surface portion which is wider than said first portion;
   a second frame member which includes a second flat surface portion in contact with the first flat surface portion;
   wherein the second frame member is joined to the first frame member by bringing the second flat surface portion into contact with the first flat surface portion, and welding the first flat surface portion to the second flat surface portion with a laser beam which is oriented parallel to the first flat surface portion.

2. The vehicle body frame for a saddle-ride vehicle according to claim 1, further comprising a head pipe configured to steerably support the front wheel thereon, and wherein the first frame member is a down frame connected to the head pipe and extending downwardly therefrom, wherein:
   the down frame comprises a pipe extending rearwardly and angularly downward from the head pipe, is configured to support the motive power source thereon and includes the first flat surface portion at a front end thereof, and
   the second frame member is a head pipe extension formed integrally with the head pipe and extending rearwardly downward thereon, and includes the second flat surface portion at a rear surface thereof.

3. The vehicle body frame for a saddle-ride vehicle according to claim 2, wherein a width of the head pipe extension in a vehicle-width-direction is equal to or less than a width of the down frame in the vehicle-width-direction.

4. The vehicle body frame for a saddle-ride vehicle according to claim 3, wherein the head pipe and the head pipe extension are formed integrally as a forged part.

5. The vehicle body frame for a saddle-ride vehicle according to claim 2, wherein the head pipe and the head pipe extension are formed integrally as a forged part.

6. The vehicle body frame for a saddle-ride vehicle according to claim 1, further comprising:
a head pipe configured to steerably support the front wheel thereon;
a main frame connected to the head pipe and extending toward a rear of the vehicle; wherein:
the first frame member is a down frame comprising a pipe extending rearwardly and angularly downward from the head pipe, is configured to support the motive power source thereon, and includes the first flat surface portion at a rear surface thereof, and
the second frame member is a reinforcing member connected at a front end thereof to the down frame, and connected at a rear end thereof to the main frame, and the second frame member includes the second flat surface portion at a front end thereof.

7. The vehicle body frame for a saddle-ride vehicle according to claim 6, wherein a width of the front surface of the reinforcing member in a vehicle-width-direction is equal to or less than a width of the down frame in the vehicle-width-direction.

8. The vehicle body frame for a saddle-ride vehicle according to claim 6, wherein:
the down frame further includes a third flat surface portion equivalent to the first flat surface portion at a front surface,
the head pipe includes a head pipe extension formed integrally therewith and extending rearwardly downward, and includes a fourth flat surface portion equivalent to the second flat surface portion at a rear surface of the head pipe extension, and
a width of the head pipe extension in a vehicle-width-direction is equal to or less than a width of the down frame in the vehicle-width-direction.

9. The vehicle body frame for a saddle-ride vehicle according to claim 1, wherein:
the first frame member is an angular pipe and includes the first flat surface portion at one of a plurality of surfaces thereof, and
the second frame member is a motive-power-source fastening bracket for fastening the motive power source to the angular pipe.

10. The vehicle body frame for a saddle-ride vehicle according to claim 9, wherein the motive-power-source fastening bracket is a plate-shaped member having a plurality of flat surfaces thereon, and one of the flat surfaces is the second flat surface portion.

11. A vehicle body frame for a saddle-ride vehicle, said vehicle body frame configured for rotatably supporting a front wheel and a rear wheel, supporting a motive power source disposed between the front wheel and the rear wheel, and supporting a seat thereon above the motive power source, said vehicle body frame comprising:
a head pipe which is configured to steerably support the front wheel thereon;
a main frame connected to the head pipe and extending toward a rear of the vehicle;
a down frame comprising a pipe extending rearwardly and angularly downward from the head pipe, the down frame configured to support the motive power source thereon, the down frame having a first portion with a predetermined thickness and also having a first flat surface portion at a rear surface thereof which is wider than said first portion; and
a reinforcing member connected at a front end thereof to the down frame, and connected at a rear end thereof to the main frame, the reinforcing member having a second flat surface portion at a front end thereof which contacts the first flat surface portion of the down frame;
wherein the reinforcing member is joined to the down frame by bringing the second flat surface portion into contact with the first flat surface portion, and welding the first flat surface portion to the second flat surface portion with a laser beam which is oriented parallel to the first flat surface portion.

12. The vehicle body frame for a saddle-ride vehicle according to claim 11, wherein a width of the front surface of the reinforcing member in a vehicle-width-direction is equal to or less than a width of the down frame in the vehicle-width-direction.

13. The vehicle body frame for a saddle-ride vehicle according to claim 11, wherein:
the down frame further includes a third flat surface portion equivalent to the first flat surface portion at a front surface,
the head pipe includes a head pipe extension formed integrally therewith and extending rearwardly downward, and includes a fourth flat surface portion equivalent to the second flat surface portion at a rear surface of the head pipe extension, and
a width of the head pipe extension in a vehicle-width-direction is equal to or less than a width of the down frame in the vehicle-width-direction.

14. A motorcycle comprising a vehicle body frame, a front wheel and a rear wheel rotatably supported on said vehicle body frame, a motive power source supported on said vehicle body frame between the front wheel and the rear wheel, and a seat attached to said vehicle body frame and disposed above the motive power source, wherein said vehicle body frame comprises:
a head pipe which is steerably supporting the front wheel thereon;
a main frame connected to the head pipe and extending toward a rear of the vehicle;
a down frame comprising a pipe extending rearwardly and angularly downward from the head pipe, the down frame configured to support the motive power source thereon, the down frame having a first portion with a predetermined thickness and also having a first flat surface portion at a rear surface thereof which is wider than said first portion; and
a reinforcing member connected at a front end thereof to the down frame, and connected at a rear end thereof to the main frame, the reinforcing member having a second flat surface portion at a front end thereof which contacts the first flat surface portion of the down frame;
wherein the reinforcing member is joined to the down frame by bringing the second flat surface portion into contact with the first flat surface portion, and welding the first flat surface portion to the second flat surface portion with a laser beam which is oriented parallel to the first flat surface portion.

15. The motorcycle according to claim 14, wherein a width of the front surface of the reinforcing member in a vehicle-width-direction is equal to or less than a width of the down frame in the vehicle-width-direction.

16. The motorcycle according to claim 14, wherein:
the down frame further includes a third flat surface portion equivalent to the first flat surface portion at a front surface,
the head pipe includes a head pipe extension formed integrally therewith and extending rearwardly downward, and includes a fourth flat surface portion equivalent to the second flat surface portion at a rear surface of the head pipe extension, and a width of the head pipe extension in a vehicle-width-direction is equal to or less than a width of the down frame in the vehicle-width-direction.

* * * * *